(12) United States Patent
Stephenson

(10) Patent No.: US 8,789,259 B2
(45) Date of Patent: Jul. 29, 2014

(54) METHOD OF WINDING A STATOR CORE WITH A CONTINUOUS CONDUCTOR HAVING A RECTANGULAR CROSS-SECTION AND A STATOR CORE

(75) Inventor: Mark A. Stephenson, Fairland, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 389 days.

(21) Appl. No.: 13/298,813

(22) Filed: Nov. 17, 2011

(65) Prior Publication Data

US 2013/0127270 A1 May 23, 2013

(51) Int. Cl.
*H02K 15/00* (2006.01)

(52) U.S. Cl.
USPC ............................. 29/596; 29/598; 310/216.1

(58) Field of Classification Search
USPC ......... 29/596, 598, 732, 605–609; 310/216.1, 310/216.11
See application file for complete search history.

(56) References Cited

U.S. PATENT DOCUMENTS

| | | |
|---|---|---|
| 3,496,394 A | 2/1970 | Balcke et al. |
| 3,532,402 A | 10/1970 | Beery et al. |
| 4,228,210 A | 10/1980 | Scribner |
| 4,429,927 A | 2/1984 | Kawabata |
| 4,606,000 A | 8/1986 | Steele et al. |
| 5,059,042 A | 10/1991 | Grierson |
| 5,245,237 A | 9/1993 | Fisher et al. |
| 5,315,195 A | 5/1994 | Bradfield et al. |
| 5,451,823 A | 9/1995 | Deverall et al. |
| 5,714,824 A | 2/1998 | Couture et al. |
| 5,744,892 A | 4/1998 | Mukai et al. |
| 5,780,953 A | 7/1998 | Umeda et al. |
| 5,977,669 A | 11/1999 | Yoshida et al. |
| 6,150,741 A | 11/2000 | Hayashi et al. |
| 6,317,962 B1 | 11/2001 | Adachi et al. |
| 6,376,961 B2 | 4/2002 | Murakami et al. |
| 6,486,580 B1 | 11/2002 | Cenzer et al. |
| 6,507,137 B2 | 1/2003 | Asao et al. |
| 6,657,338 B2 | 12/2003 | Fisher et al. |
| 6,664,674 B2 | 12/2003 | Ihata |
| 6,664,703 B2 | 12/2003 | Oketani et al. |

(Continued)

FOREIGN PATENT DOCUMENTS

| | | |
|---|---|---|
| EP | 0923187 B1 | 2/2002 |
| JP | 1286755 A | 11/1989 |

(Continued)

OTHER PUBLICATIONS

International Search Report and Written Opinion for PCT Application No. PCT/US2012/064753, dated Mar. 15, 2013, pp. 1-10.

(Continued)

*Primary Examiner* — Thanh Lam
(74) *Attorney, Agent, or Firm* — Cantor Colburn LLP

(57) ABSTRACT

A method of inserting a continuous conductor having a rectangular cross-section into slot segments formed in a stator core includes deforming in a first direction a core member having a first end portion that extends to a second end portion to widen an opening at end portions of the slot segments, inserting one or more continuous conductors having a rectangular cross-section into select ones of the slot segments, and deforming in a second direction the core member to narrow the opening at end portions of the slot segments.

5 Claims, 5 Drawing Sheets

(56) References Cited

U.S. PATENT DOCUMENTS

| | | | |
|---|---|---|---|
| 6,742,238 B2 * | 6/2004 | Lee | 29/596 |
| 6,754,946 B2 | 6/2004 | Nguyen | |
| 6,774,518 B2 | 8/2004 | Howe et al. | |
| 6,819,024 B1 | 11/2004 | Fujita et al. | |
| 6,831,382 B1 | 12/2004 | Lyle et al. | |
| 6,885,127 B1 | 4/2005 | Higashino et al. | |
| 6,886,236 B2 | 5/2005 | Higashino et al. | |
| 7,042,129 B2 * | 5/2006 | Neet | 310/208 |
| 7,132,775 B2 | 11/2006 | Oohashi et al. | |
| 7,143,501 B2 | 12/2006 | Bramson et al. | |
| 7,217,106 B2 | 5/2007 | Tanaka et al. | |
| 7,234,226 B2 | 6/2007 | Fujita et al. | |
| 7,282,830 B2 | 10/2007 | Harrer et al. | |
| 7,345,391 B2 | 3/2008 | Bradfield et al. | |
| 7,352,091 B2 | 4/2008 | Bradfield | |
| 7,417,344 B2 | 8/2008 | Bradfield | |
| 7,546,672 B2 * | 6/2009 | Murase | 29/596 |
| 7,589,441 B2 | 9/2009 | Kalsi et al. | |
| 7,600,311 B2 | 10/2009 | Kreuzer et al. | |
| 7,687,954 B2 | 3/2010 | Neet et al. | |
| 7,827,672 B2 * | 11/2010 | Asao | 29/596 |
| 8,519,577 B2 | 8/2013 | Stiesdal | |
| 2003/0233748 A1 | 12/2003 | Gorohata et al. | |
| 2004/0239190 A1 | 12/2004 | Rau et al. | |
| 2005/0006975 A1 | 1/2005 | Bradfield et al. | |
| 2005/0046299 A1 * | 3/2005 | Brown et al. | 310/207 |
| 2007/0216253 A1 | 9/2007 | Shendi | |
| 2009/0001841 A1 | 1/2009 | Naganawa et al. | |
| 2010/0066198 A1 * | 3/2010 | Fubuki et al. | 310/208 |
| 2010/0077599 A1 | 4/2010 | Tokizawa | |
| 2010/0295390 A1 | 11/2010 | Rau | |
| 2011/0043059 A1 | 2/2011 | Wolf et al. | |
| 2011/0095639 A1 | 4/2011 | Nakamura | |

FOREIGN PATENT DOCUMENTS

| | | | |
|---|---|---|---|
| JP | 1169721 A | 3/1999 | |
| JP | 2011151933 A | 8/2011 | |
| KR | 1020100070147 A | 6/2010 | |

OTHER PUBLICATIONS

International Search Report and Written Opinion for PCT Application No. PCT/US2012/064598, dated Mar. 18, 2013, pp. 1-10.

International Search Report and Written Opinion for corresponding PCT Application No. PCT/US05/31347, dated Sep. 26, 2007, pp. 1-13.

International Search Report and Written Opinion for PCT Application No. PCT/US2012/064947, dated Mar. 28, 2013, pp. 1-12.

* cited by examiner

METHOD OF WINDING A STATOR CORE WITH A CONTINUOUS CONDUCTOR HAVING A RECTANGULAR CROSS-SECTION AND A STATOR CORE

BACKGROUND OF THE INVENTION

Exemplary embodiments pertain to the art of electric machines and, more particularly, to a method of winding a stator core with a continuous conductor having a rectangular cross-section.

At present, many electric machines include stator cores that are wound with wire having a circular cross-section. The stator core is held stationary and the wire is fed through a winding needle that is rotated about a stator tooth. Once the stator tooth is wound, the wire is advanced to a subsequent stator tooth. At each tooth, the winding needle not only travels along a circular path but also moves in and out to layer the wire. Upon exiting the winding needle, the wire twists as a result of rotational forces developed while traveling along the circular path.

In other cases, the stator core is wound with wire having a rectangular cross-section. A continuous wire is laid into slot segments formed in the stator core. In this manner, the wire is not subjected to twisting. The use of rectangular wire increases a fill volume of the slot segments which, in turn, enhances electrical properties of the stator. Electrical properties of the stator are further enhanced by adding tooth elements to the slot segments. The tooth elements reduce torque ripples during start up of the electric machine. However, the tooth elements also create a localized narrowing of the slot segments. The localized narrowing precludes the use of a continuous wire having a rectangular cross-section. In such cases, the wire is formed into discrete sections or hairpins that are axially inserted into the slot segments. Once all sections are inserted, select ones of the sections are joined to form one or more phase windings for the stator.

BRIEF DESCRIPTION OF THE INVENTION

Disclosed is a method of inserting a continuous conductor having a rectangular cross-section into slot segments formed in a stator core. The method includes deforming in a first direction a core member having a first end portion that extends to a second end portion to widen an opening at end portions of the slot segments, inserting one or more continuous conductors having a rectangular cross-section into select ones of the slot segments, and deforming in a second direction the core member to narrow the opening at end portions of the slot segments.

Also disclosed is a stator core including a core member having a first end portion that extends to a second end portion through a first surface and an opposing second surface and a plurality of slot segments formed in the core member. Each of the plurality of slot segments includes first and second wall portions spaced one from another to define a first width of the plurality of slot segments. Each of the first wall portions includes a first end portion, a second end portion, and a tooth element arranged at the second end portion, and each of the second wall portions includes a first end section, a second end section, and a tooth member at the second end section, the tooth element on each first wall portion extends toward the tooth member on each second wall portion to define a second width of the slot segment. A continuous conductor having a plurality of loops defined by first and second substantially linear portions is mounted to the stator core. The first and second linear portions are arranged in the plurality of slot segments to form a stator winding. The continuous conductor includes a rectangular cross-section having a width that is smaller than the first width of the slot segments and larger than the second width of the slot segments.

Further disclosed is an electric machine including a housing, a rotor rotatably supported within the housing, and a stator fixedly mounted relative to the rotor. The stator includes a stator core including a core member having a first end portion that extends to a second end portion through a first surface and an opposing second surface and a plurality of slot segments formed in the core member. Each of the plurality of slot segments includes first and second wall portions spaced one from another to define a first width of the plurality of slot segments. Each of the first wall portions includes a first end portion, a second end portion, and a tooth element arranged at the second end portion, and each of the second wall portions includes a first end section, a second end section, and a tooth member at the second end section. The tooth element on each first wall portion extends toward the tooth member on each second wall portion to define a second width of the slot segment. A continuous conductor having a plurality of loops defined by first and second substantially linear portions is mounted to the stator core. The first and second linear portions are arranged in the plurality of slot segments to form a stator winding. The continuous conductor includes a rectangular cross-section having a width that is smaller than the first width of the slot segments and larger than the second width of the slot segments.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
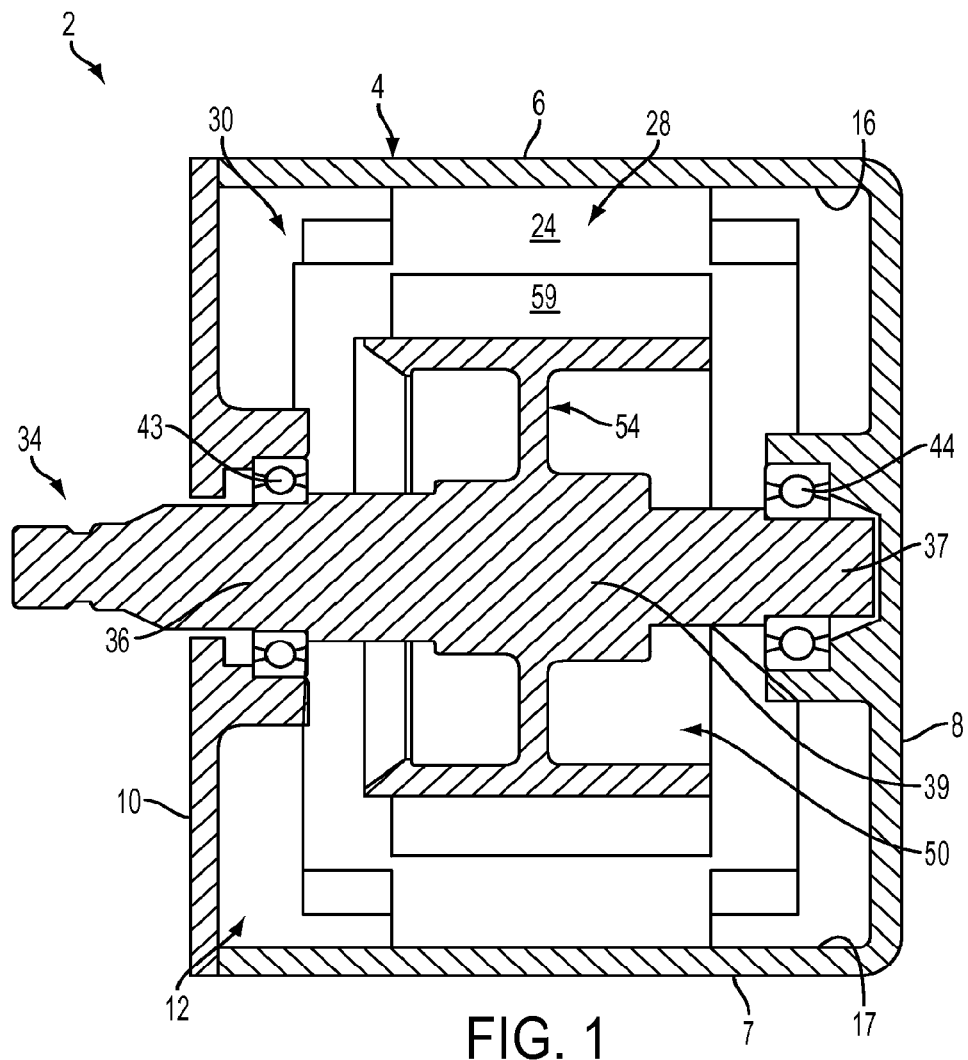
FIG. 1 depicts a cross-sectional view of an electric machine including a stator core in accordance with an exemplary embodiment.

An electric machine in accordance with an exemplary embodiment is indicated generally at 2 in FIG. 1. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. Electric machine 2 is further shown to include a stator 24 arranged at inner surfaces 16 and 17 of first and second side walls 6 and 7. Stator 24 includes an annular stator core 28 which, as will be discussed more fully below, supports a plurality of stator windings 30.

Electric machine 2 is also shown to include a shaft 34 rotatably supported within housing 4. Shaft 34 includes a first end 36 that extends to a second end 37 through an intermediate portion 39. First end 36 is rotatably supported relative to second end wall 10 through a first bearing 43 and second end 37 is rotatably supported relative to first end wall 8 through a second bearing 44. Shaft 34 supports a rotor assembly 50 that is rotatably mounted within housing 4. Rotor assembly 50 includes a rotor hub 54 that is fixed relative to intermediate portion 39 of shaft 34, and a rotor lamination 59 that is configured to rotate relative to stator 24.

Figure 2:
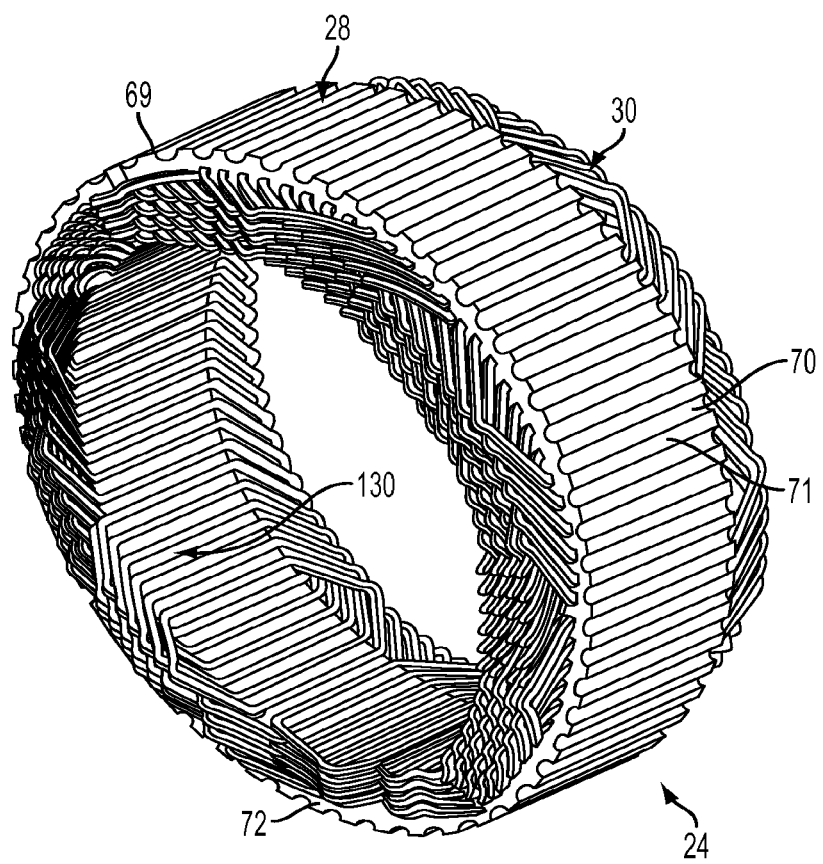
FIG. 2 depicts a perspective view of the stator core of FIG. 1.
Figure 3:
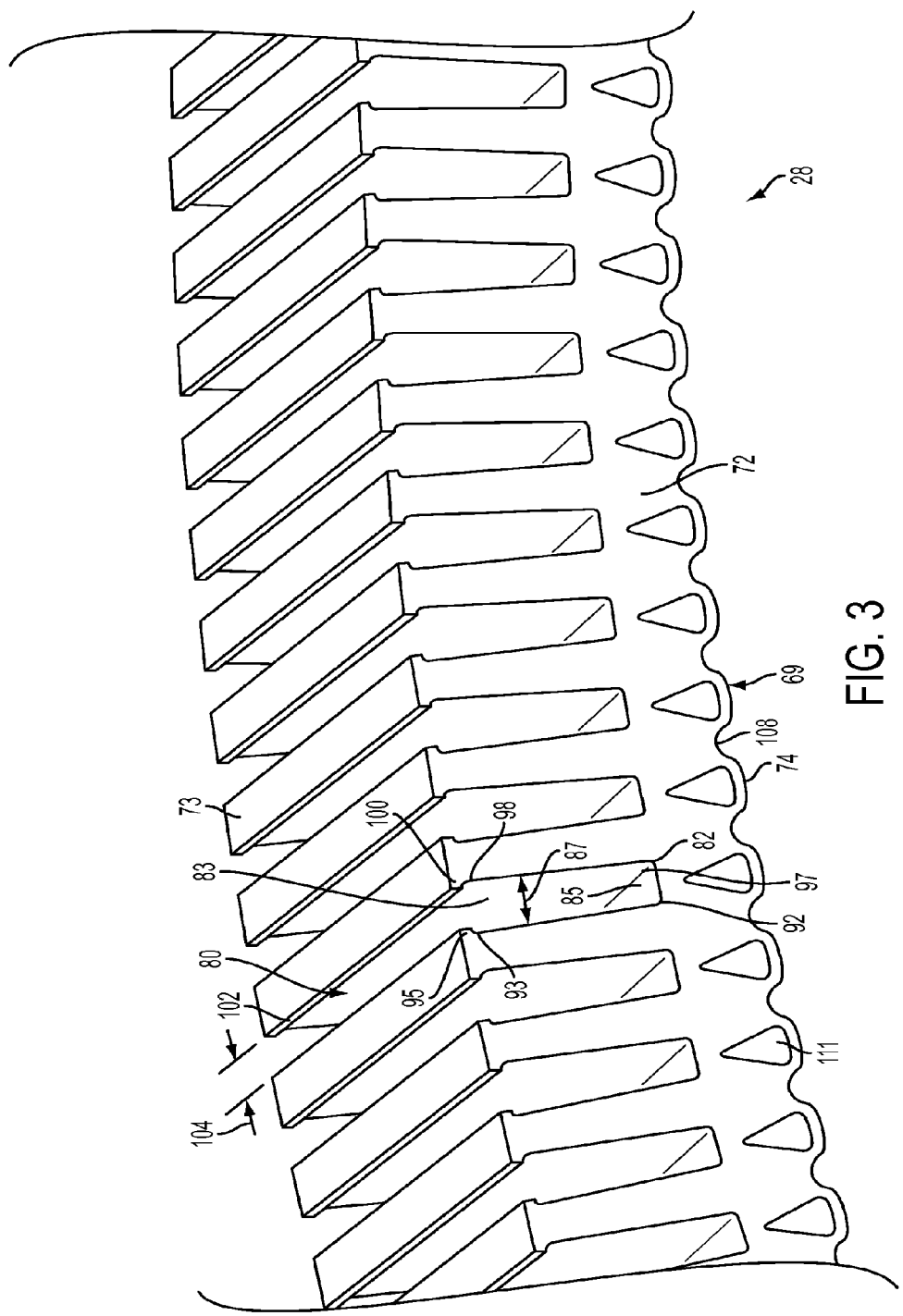
FIG. 3 depicts a perspective view of a stator core member prior to insertion of stator windings in accordance with an exemplary embodiment.

As best shown in FIGS. 2-3, stator core 28 is formed from a core member 69 having a first end 70 that extends to a second end 71 through an intermediate portion 72. Intermediate portion 72 includes a first surface 73 and an opposing second surface 74. In the exemplary embodiment shown, core member 69 includes a plurality of slot segments, one of which is indicated at 80 that receive stator windings 30 as will be detailed more fully below. Each slot segment 80 includes a first wall portion 82 and an opposing second wall portion 83 that are separated by a base portion 85 which establishes a first width 87. First wall portion 82 includes a first end portion 92 that extends from base portion 85 to a second end portion 93. Second end portion 93 includes a tooth element 95.

Similarly, second wall portion 83 includes a first end section 97 that extends from base portion 85 to a second end section 98. Second end section 98 includes a tooth member 100. Tooth member 100 is spaced from tooth element 95 to establish an opening 102 having a second width 104 of slot segment 80. Tooth member 100 and tooth element 95 are positioned on stator core 28 so as to reduce torque ripple effects associated with starts and stops of electric machine 2. Core member 69 is also shown to include a plurality of recesses 108 formed in second surface 74 as well as a plurality of cooling passages, one of which is shown at 111. Recesses 108 provide flexibility to core member 69 that allows the insertion of a number of continuous conductors 114-119 into slot segments 80. Continuous conductors 114-119 collectively define stator windings 30. Of course it should be understood that the number of continuous conductors may vary.

Figure 4:
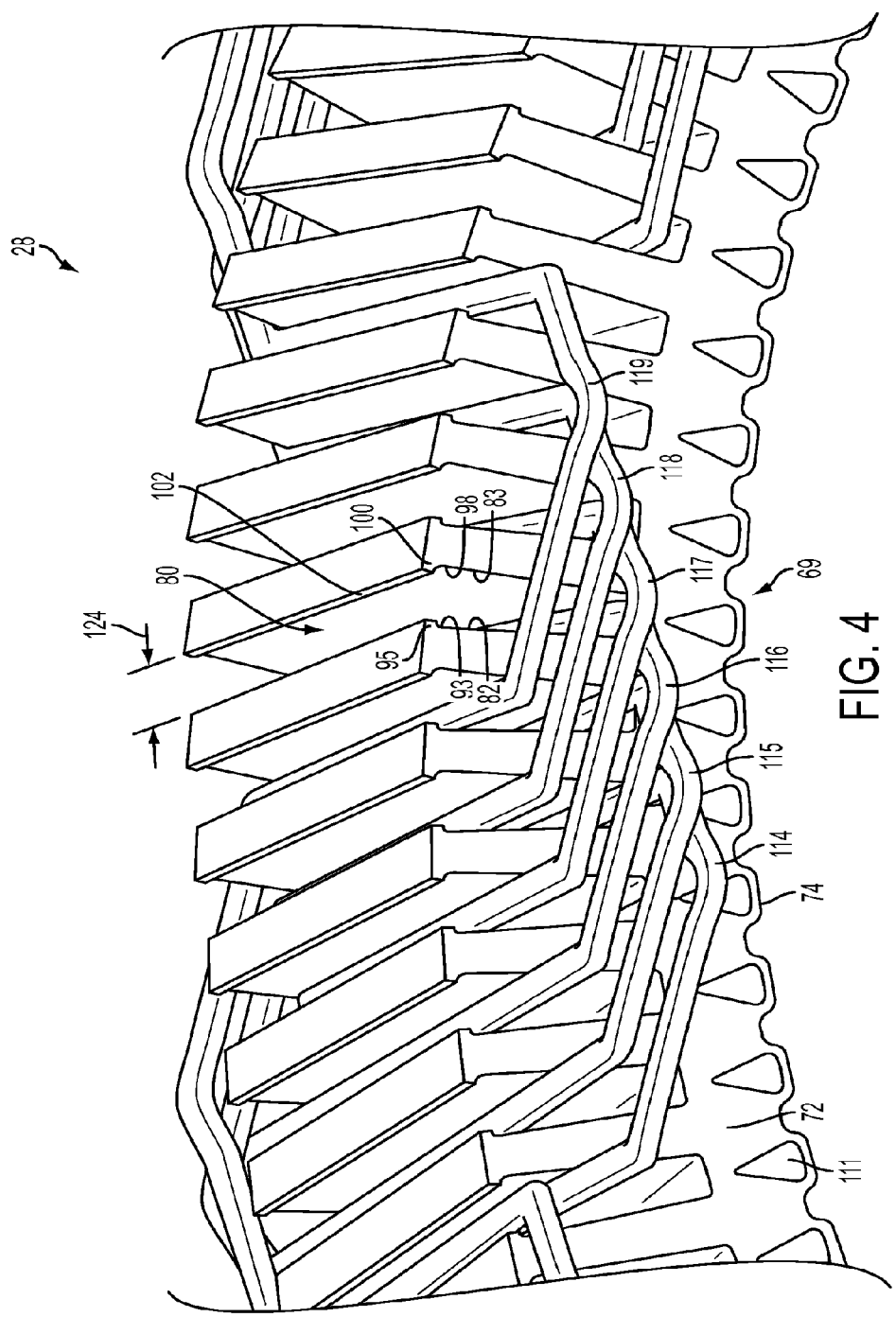
FIG. 4 depicts a perspective view of the stator core member of FIG. 3 receiving stator windings in accordance with an exemplary embodiment.
Figure 5:
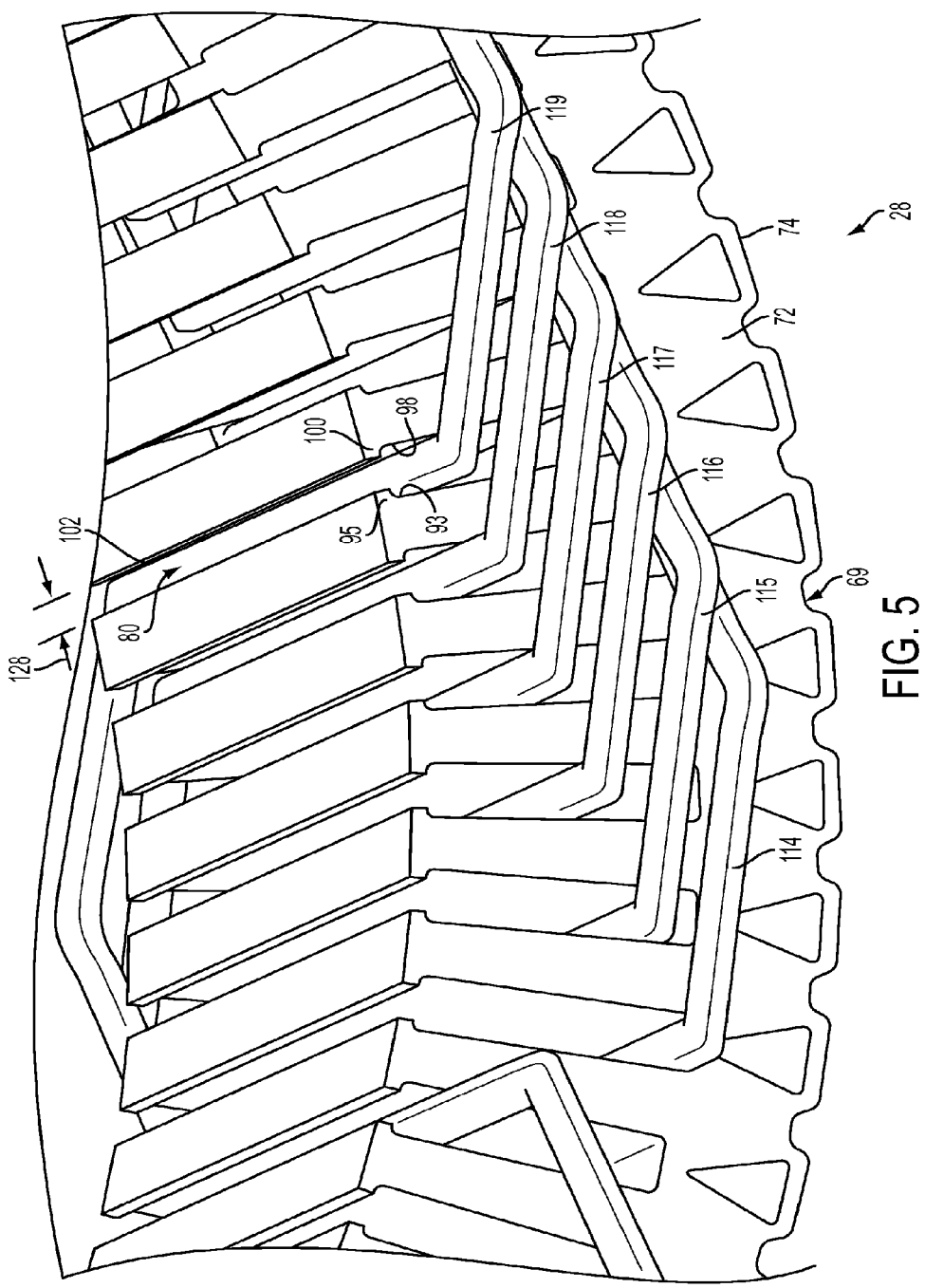
FIG. 5 depicts a perspective view of the stator core member following insertion of the stator windings in accordance with an exemplary embodiment.

In accordance with the exemplary embodiment, continuous conductors 114-119 have a rectangular cross-section that is larger than second width 104. Therefore, in order to insert continuous conductors 114-119 into slot segments 80, second width 104 is temporarily widened. As best shown in FIG. 4, prior to inserting continuous conductors 114-119, core member 69 is deformed in a first direction causing each opening 102 to widen to a third width 124. More specifically, core member 69 is deformed such that first surface 73 has a generally convex curvature and second surface 74 has a generally concave curvature. At this point, continuous conductors 114-119 are installed into select ones of the plurality of slot segments 80 to establish stator windings 30. Once all conductors are inserted, core member is deformed in a second direction, opposite to the first direction causing opening 102 to narrow to a fourth width 128 that is smaller than second width 104 such as shown in FIG. 5. More specifically, core member is deformed so as to cause first end 70 to contact second end 71 to form an annular ring 130 (FIG. 2). First end 70 is secured to second end 71 through, for example, welding, and select ones of continuous conductors 114-119 are interconnected to establish a desired wiring configuration for stator windings 30 and complete stator core 28.

At this point it should be understood that the exemplary embodiment provides a stator core having slot segments loaded with continuous conductors having a rectangular cross-section. The stator core also includes tooth elements and tooth members that reduce a width of the slot segments to less than a width of the continuous conductors. The stator core is at least twice deformed prior to completion. More specifically, a core member is first deformed in a first direction to allow the insertion of the continuous conductors and then deformed in a second direction to establish a final geometry of the stator core.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of inserting a continuous conductor having a rectangular cross-section into slot segments formed in a stator core, the method comprising:
    deforming in a first direction a core member having a first end portion that extends to a second end portion to widen an opening at end portions of the slot segments;
    inserting one or more continuous conductors having a rectangular cross-section into select ones of the slot segments; and
    deforming in a second direction the core member to narrow the opening at end portions of the slot segments.

2. The method of claim 1, further comprising: joining the first end portion of the core member to the second end portion of the core member to form an annular stator core.

3. The method of claim 1, wherein widening the opening includes separating tooth elements provided on the end portions of the slot segments.

4. The method of claim 1, wherein deforming in the first direction establishes a convex curvilinear surface defined by the end portions of the slot segments between the first end portion and the second end portion of the core member.

5. The method of claim 1, wherein deforming in the second direction establishes a concave curvilinear surface defined by the end portions of the slot segments between the first end portion and the second end portion of the core member.

* * * * *